United States Patent [19]

Grynberg et al.

[11] Patent Number: 5,004,341
[45] Date of Patent: Apr. 2, 1991

[54] ACTIVE OPTICAL GYROMETER EMPLOYING A PHASE CONJUGATION

[75] Inventors: Gilbert Grynberg; Michel M. E. Pinard, both of Paris; Marc A. F. Faucheux, Orsay Cedex, all of France

[73] Assignee: Quantel, S.A., Courtaboouf-Orsay Cedex, France

[21] Appl. No.: 249,557

[22] Filed: Sep. 26, 1988

[30] Foreign Application Priority Data

Sep. 25, 1987 [FR] France .................. 87 13321

[51] Int. Cl.$^5$ ............................................. G01C 19/64
[52] U.S. Cl. ....................................... 356/350; 372/94
[58] Field of Search .......................... 356/350; 372/94

[56] References Cited

U.S. PATENT DOCUMENTS

| | | | |
|---|---|---|---|
| 4,152,071 | 5/1979 | Podgorski | 356/350 |
| 4,396,290 | 8/1983 | Morris | 356/350 |
| 4,429,393 | 1/1984 | Giuliano | 356/350 |
| 4,525,843 | 6/1985 | Diels | 356/350 |
| 4,659,223 | 4/1987 | Huignard et al. | 356/350 |

OTHER PUBLICATIONS

Optics Letters, vol. 1, No. 1, Jul. 1977, pp. 16–18; A. Yariv et al.: "Amplified Reflection, Phase Conjugation, and Oscillation in Degenerate Four-Wave Mixing".

Primary Examiner—Samuel Turner
Attorney, Agent, or Firm—Wenderoth, Lind & Ponack

[57] ABSTRACT

The active ring gyrometer comprises a path closed by mirrors (11,12,13) forming a resonant cavity (10) in which is placed a cell (20) containing an optically non-linear medium which permits by a four wave mixture the coherent auto-oscillation of two conjugated counter-rotative waves. The gyrometer further includes two pumping laser beams (31, 32), an optical device (40) for irradiating the medium of the cell, an optical system (50) for causing these two waves to interfere, and a detector (60). The optically non-linear medium and the intensity modulators (70) of the pumping beams permit the production of an optical "bias" which eliminates the blind zone in which the gyrometer is unsuitable for measuring relatively low rates of rotation.

15 Claims, 4 Drawing Sheets

ACTIVE OPTICAL GYROMETER EMPLOYING A PHASE CONJUGATION

BACKGROUND OF THE INVENTION

The invention relates to inertial devices for measuring rotation by means of a resonant optical cavity in the form of a ring and more particularly concerns active ring gyrometers in which there is an amplifier medium, and more particularly a phase conjugation non-linear amplifier medium which may be of a gaseous or a semiconductor material. The invention relates especially to the manner of ensuring decoupling of the frequencies of two counter-rotative waves so as to prevent them from "locking" under certain conditions.

As is known, optical gyroscopes having a resonant cavity employ the Sagnac effect. This effect, which is caused by differences in relative inertia, has for a result that, when two waves circulate in the same geometrical path in opposite directions, the times they take for traveling through this same geometrical path are different due to the rotation of the system which carries this geometrical path relative to a Galilean reference system. Such differences in traveling time destroy the symmetry of the optical paths "seen", respectively, by each of the two waves.

The article published under the title "Optical Gyroscopes" by J. J. Roland et al. in the review "Optics and Laser Technology" of October 1981, starting on page 239, briefly explains the manner in which optical gyroscopes operate and the different varieties thereof which have been developed.

All the optical gyroscopes operate in accordance with the same principle.

If two beams of coherent light are made to propagate in two opposite directions in the same geometrical path which is closed in the form of a ring, a difference occurs between the beams when the optical paths rotate. A time difference occurs which is proportional to the speed of rotation of the system relative to a Galilean reference system. This time difference of the travel results in a difference in the optical path including a difference of frequency between the two waves propogated in opposite directions. This difference of frequency becomes apparent when the two beams are made to interfere so as to obtain beats representative of the interference.

The mathematical formulation may be expressed as follows.

The difference $\Delta t$, of the travel times of the two waves in opposite directions along the same geometrical path closed in the form of a ring which results in a lack of symmetry in their optical paths, is written:

$$\Delta t = 4\, S.\Theta/c^2$$

in which S is the inscribed area of the ring path, $\Theta$ is the speed of rotation impressed on the path, and c is the velocity of light.

From this equation, the following operating difference is obtained:

$$\Delta p = c\Delta t = 4\, S.\Theta/c = 4\, S\, \Theta/\lambda f$$

in which $\lambda$ is the wavelength of the beam and f is the frequency of resonance when the system is immobile.

Likewise, the relative variation of the operating difference is expressed as follows:

$$\Delta p/p = \Delta f/f$$

and the frequency slip $\Delta f = 4\, S.\Theta/\lambda p$.

By integrating the above equation with respect to time, a resultant number of fringes N is obtained which is a function of the speed of rotation and written:

$$N = \int_o^t \Delta f \cdot dt = K \cdot \int_o^t \Theta dt = K \cdot \Theta$$

Thus it can be seen that the number of fringes N is proportional to the angle $\Theta$ through which the geometrical path, or the system carrying the geometrical path, has rotated.

The active resonant ring cavity gyroscopes have shown their worth but are not without drawbacks.

As is known, when the frequency of the beats of the two interfering waves is lower than a certain value, a mutual coupling of the two waves results in their being coupled to each other such that they oscillate at the same frequency. This results in a "locking" wherein the frequency difference, which was proportional to the rotation, disappears. This "locking" phenomenon occurs at low rates of rotation and results in the gyroscope no longer revealing the rotations and, in a sense, becoming "blind" and therefore useless.

This mutual coupling between the two counter-rotative waves is in particular due to the retro-diffusion introduced by the optical components such as the mirrors which define the geometrical closed ring path.

The multiplying coefficient K is, in fact, a function of the rotation of the system and instead of the frequency slip response curve as a function of the rotation being rectilinear throughout, it is hyperbolic at low speeds of rotation and rectilinear at high speeds. It will therefore be understood that between the two limit values, one for each direction of rotation, which mark the boundaries of the "blind" zone, the gyroscope is incapable of revealing a rotation of the system by which it is carried.

One of the most currently employed solutions for overcoming this drawback, consists in subjecting the gyroscope to periodical oscillations alternating at a frequency on the order of a few hundreds Hertz. With this remedy, it is possible to obtain a response which is practically linear for a wide range of operation.

Such an oscillatory swinging, or "periodical bias" is mostly obtained mechanically, for example by means of torsion bars which are made to operate at their frequency of resonance, or "magnetic mirrors" employing the Kerr magneto-optical effect.

As is known, gyrometers having an active laser in the form of a ring employ an amplifier medium which is placed in the ring and whose use involves an electrical discharge in a gas. Consequently, an exterior electrical field must be created to excite the amplifier medium.

The use of a gas as an amplifier medium, most often a He - Ne mixture excited by an electrical discharge, produces other defects of non-reciprocity depending on the direction of travel due, for example, to an imperfect alignment of the resonant cavity, to the flow of the gas subjected to the discharge, or to a thermal sensitivity of the alignment and the flow. Furthermore, the use of such a medium requires the forming of a vacuum which is always delicate, complex and costly.

SUMMARY OF THE INVENTION

An object of the invention is to improve ring active gyrometers by arranging them so that it is no longer necessary to employ an oscillatory swing of the geometrical path through which the light travels in order to cause the apparatus to be sensitive in the "blind" zone and so that it is no longer necessary to employ a vacuum and an exterior electrical field for exciting the amplifier medium.

According to the invention, the properties of optical phase conjugation components are employed.

This type of optical component is described, for example, in an article entitled "Phase Conjugation: Reversing Laser Aberrations" by D. M. Pepper et al. published in the review "Phototonics Spectra" August 1986 starting on page 95.

As explained in this article, when a light wave having the equation $$E = A(x,y) \exp[i(\omega t - kz + \Phi(x,y))]$$

and propagating in the direction z is received by a phase conjugation optical component, this optical component produces a conjugated wave of the incident wave which is propagated in the direction $-z$.

Such a reflected wave therefore is defined by the equation $$E = \gamma_c A(x,y) \exp[i(\omega t - kz - \Phi(x,y))]$$

in which $\gamma_c$ is the coefficient of reflection by phase conjugation.

The invention provides a ring active gyrometer which no longer employs a gas subjected to an exterior electrical discharge, but rather employs a non-linear optical medium phenomenon permitting the auto-oscillation of two conjugate waves in a resonant cavity by way of optical pumping from exterior laser sources.

In many optically non-linear media such as, for example, atomic vapors or semiconductors, the non-linear interaction of the medium with two pumping waves is manifested by the absorption of a photon of each of the two pumping waves and the emission of two photons propagating in opposite directions and conjugate with each other. When such an optically non-linear medium having a gain width $\Delta\omega_g$ is enclosed in a linear resonant cavity having a resonance peak width $\Delta\omega_c$, this emission of a couple of photons results in auto-oscillation of the cavity at a frequency coinciding with the frequency of the pumping waves. The optically non-linear medium is itself employed as an amplifier medium, since it permits, upon the mixture of the four waves, gains higher than unity for the two counter-rotative waves propagating in the cavity.

If there is placed in a resonant ring cavity a medium which conjugates the phase, it can be shown mathetmatically, for cavities and media satisfying the condition $\Delta\omega_g >> \Delta\omega_c$ that, in the absence of any retro-diffusion, the difference of the frequencies of oscillation of the two waves propagating in opposite directions is equal to the difference of the natural frequencies of oscillations of the cavity for the two directions of rotation. This condition $\Delta\omega_g >> \Delta\omega_c$ cannot be obtained with optically non-linear phase conjugation media of the photorefractive type.

If the waves $E_+$, $E_-$ propagating in the ring have for respective frequencies $\omega_+$ and $\omega_-$, and if $\Omega_+$ and $\Omega_-$ designate the natural frequencies of the resonant cavity for the two directions of rotation, this relation is written:

$$\omega_+ - \omega_- = \Omega_+ - \Omega_-$$

In practice, the retro-diffusion introduced by the mirrors causes mixing in the two directions of propagation and results in a "locking" of the frequencies which then become equal to the frequency of the pumping waves.

According to the invention, the optically non-linear medium is used for producing a difference in the optical paths between the two counter-rotative waves by using two pumping waves having equal frequencies but different intensities. In this situation, the periodical bias effect is obtained upon varying the differences between the intensities.

The optically non-linear medium, within which occurs a four wave degenerated mixture, when constituted by an atomic vapor and a buffer gas, permits modifying in different manners the optical paths in the two directions of propagation and, therefore, permits the use of an optical, rather than mechanical, bias for avoiding the "blind" zone.

Indeed, due to the presence of collisions, the non-linear index of the medium "seen" by each of the two waves which travel in opposite directions varies in relation to the intensities of the two pumping waves.

If $n_+^*$ and $n_-^*$ designate the non-linear indices of the medium "seen" respectively by the waves $E_+$ and $E_-$ and if $I_1$ and $I_2$ designate the intensities of the pumping waves $E_1$ and $E_2$, these relations are written as $$n_+^* = \alpha I_1 + \beta I_2$$

$$n_-^* = \alpha I_2 + \beta I_1,$$

in the case where the intensities of the waves $E_+$ and $E_-$ are relatively small so as not to contribute to the non-linear index $n^*$.

The asymmetry present in the case of a vapor medium results from a dephasing caused by the Doppler effect which, in turn, results in the networks created by the waves $E_+$ and $E_1$ on one hand and $E_+$ and $E_2$ on the other, respectively, having different lifetimes.

Thus, it can be seen that the difference of operation, due to the difference of the lengths of the optical paths in the two directions of rotation, is proportional to:

$$\Delta P = (\alpha - \beta)(I_1 - I_2).$$

Thus, the difference between the frequencies $(\Delta f = \omega_+ - \omega_- = \Omega_+ - \Omega_-)$ may be rendered sufficiently large to be outside of the "blind" zone.

Thus, in accordance with the invention, it can be seen that, due to the use of an optically non-linear medium which serves both as an amplifier medium and a phase conjugation medium, a purely optical "bias" may be achieved.

According to the invention, this "bias" is rendered alternating and symmetrical, with respect to the zone wherein the two waves are coupled in the cavity, by varying the particular intensity of each of the pumping waves by using either acousto-optical modulators or electro-optical crystals.

Apart from the elimination of the problems related to the existence of the periodical "bias" or mechanical or magneto-optical oscillatory swing, the invention also provides for easy modification of the intensity difference $(I_1-I_2)$ which allows for considerable reduction in the duration of the passage through the "blind zone".

The invention provides an active phase conjugation ring gyrometer which comprises a resonant cavity in which is disposed a cell containing an optically non-linear amplifier medium from which counter-rotative waves are produced, a pumping laser source, an optical device for irradiating the optically non-linear medium with two beams from the pumping laser source, an optical system for causing the counter-rotative waves to interfere, and a beat detector.

Such an active resonant ring gyrometer is characterized, in particular, in that the two pumping laser beams are oppositely directed colinear beams for irradiating the medium, and in that intensity modulators are arranged to modulate intensity of the two beams from the two pumping sources.

BRIEF DESCRIPTION OF THE DRAWING FIGURES

Other features of the invention will be apparent from the following description and the accompanying drawing figures in which.

DETAILED DESCRIPTION OF THE INVENTION

Figure 1A:
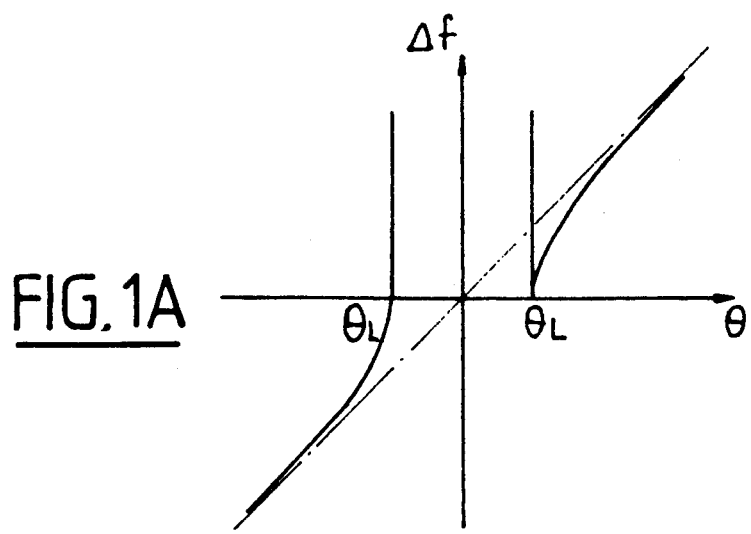
FIGS. 1A, 1B and 1C illustrate the problems relating to the mutual coupling due to a phenomenon of "locking" in the resonant cavity which causes the "blind" zone to appear.

FIG. 1A illustrates the frequency slip $\Delta f$ between the two waves circulating in opposite directions in the ring of the gyrometer as a function of the angular rate $\Theta$ of rotation of the gyrometer. The dot-dash line represents the theoretical linear response in the absence of "locking" and the hyperbolic branches in full line represent the real response resulting from the mutual coupling. The "blind" zone has its boundaries indicated by the limit values $\Theta_L$.

Figure 1B:
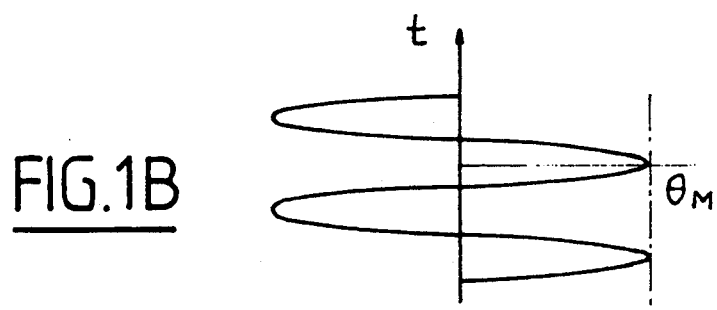

FIG. 1B illustrates the oscillatory swing or "periodical bias" impressed on the gyrometer to avoid the existence of the "blind" zone. In FIG. 1B, the periodical oscillation is plotted on the abscissa and the time is plotted on the ordinate, the maximum elongation $\Theta_M$ being greater than $\Theta_L$ in FIG. 1A.

Figure 1C:
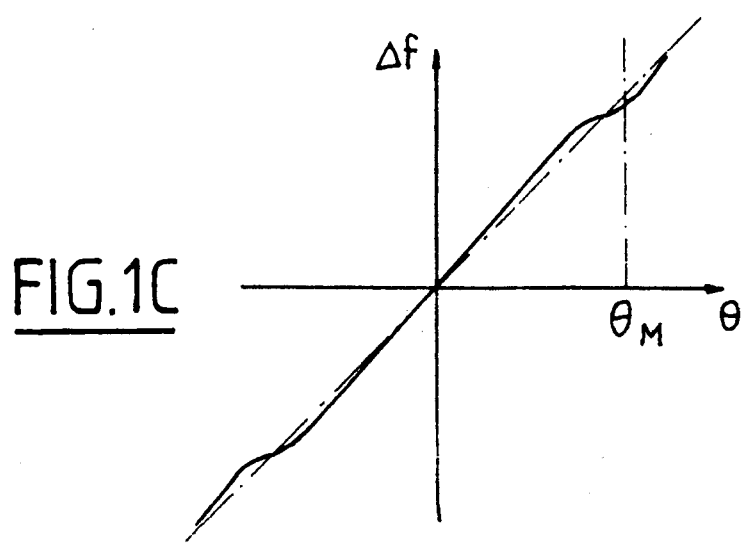

FIG. 1C illustrates in full line the real response of the gyrometer in the presence of a "periodical bias". The theoretical response is again represented by a straight dot-dash line.

Figure 2:
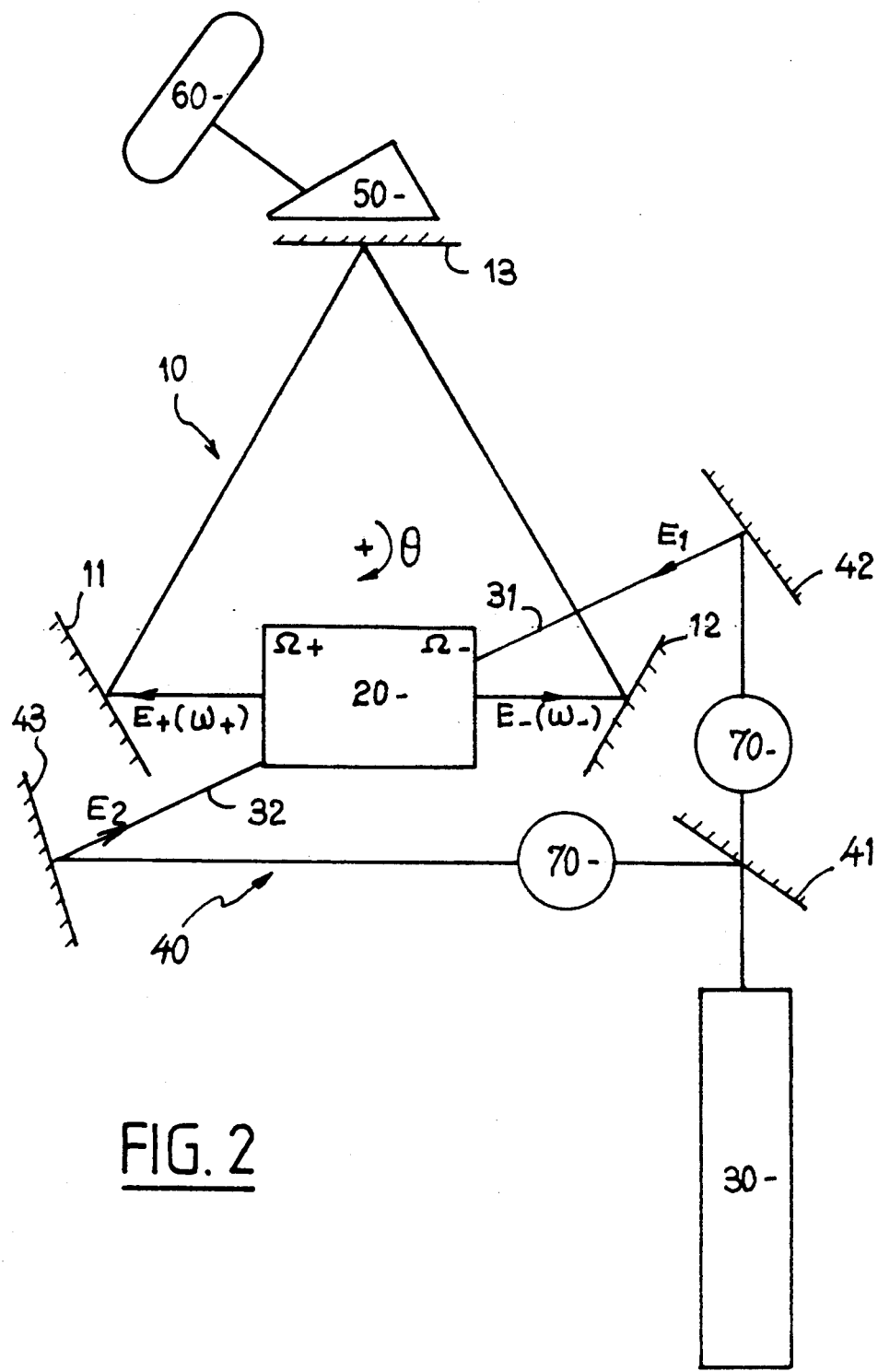
FIG. 2 is a diagrammatic view of an embodiment of an active resonant ring gyrometer according to the invention.

With reference to the diagrammatic FIG. 2, it can be seen that an embodiment of an active phase conjugation resonant ring gyrometer according to the invention mainly comprises a geometrical path forming a resonant cavity 10 defined by at least three mirrors 11, 12, 13, at least one 13 of which is partially transparent.

Disposed in this path 10 or resonant cavity is an optically non-linear medium which is contained in a cell 20 and emits two counter-rotative waves $E_+$ and $E_-$ when it is excited. This medium is such that upon being triggered by its own background noise, it emits waves $E_+$ and $E_-$ of frequency $\omega_+$ and $\Omega_-$, respectively, which oscillate in the cavity. The natural frequencies of the cavity are $\Omega_+$ and $\Omega_-$.

This optically non-linear medium is irradiated by two colinear pumping laser beams 31 and 32 so as to produce pumping-waves $E_1$ and $E_2$ having intensities $I_1$ and $I_2$, respectively.

These beams 31 and 32 are obtained from a laser 30 whose radiation is received by an optical device 40 constituted, for example, by a semi-transparent blade 41 and two mirrors 42 and 43. The radiation from laser 30 is divided by a blade 41 as illustrated in FIG. 2.

The counter-rotative waves $E_+$ and $E_-$ received by the semi-transparent mirror 13 reach an optical device 50 of any suitable conventional type, for example an adapted prism, where they are caused to interfere.

A detector 50, responsive to the beats caused by the interference of the waves, permits determination and calculation of the angle of rotation of the gyrometer by way of integration. Such a detector is conventional.

Placed in at least one of the pumping beams 31 and 32 is an intensity modulator 70 which modifies the intensity $I_1$ and/or $I_2$ of the pumping waves $E_1$ and $E_2$.

In one embodiment, the optically non-linear medium, which is irradiated by the two colinear pumping laser beams and in which the four wave mixture occurs, is constituted by sodium with a buffer gas, such as helium, at a pressure of about 0.4 kPa. This medium is contained in the cell 20 placed in the resonant cavity 10 and maintained at about 160° C. This cell is made of quartz and is closed by windows at the Brewster incidence.

Two pumping beams 31 and 32 having a power of 300 mW and a wavelength of 589 nm are obtained, for example, from a laser 30 having a coloring agent pumped by an Ar+ laser. These two colinear beams are at a small angle, on the order of 1/100th of a radian, with respect to the axis of the cavity 10. The frequency of these beams is very close to the resonant frequency of the medium, for example a few gigahertz.

The modulator or modulators 70 are arranged, for example, so as to have a continuously variable optical density.

In the foregoing, the optically non-linear medium in which the four wave degenerated quasi-mixture occurs is constituted by vapors of Na and He. Other alkaline metals may be used, such as Cs (λ: 850 nm) and Ru (λ: 780 nm), mixed with another rare gas, such as He, Ne or Kr, which are active at ambient temperature and have low densities. These materials also have the advantage of being capable of being pumped by commercially-available laser diodes.

Alternatively, the four wave mixture may be obtained by using a semi-conductor medium such as As-Ga, In-Sb.

Instead of using a laser with a coloring agent for producing the pumping beams, laser diodes of the AlGaAs type may be used. Additionally, lasers employing solids, gases or semi-conductors can be used.

Figure 3:
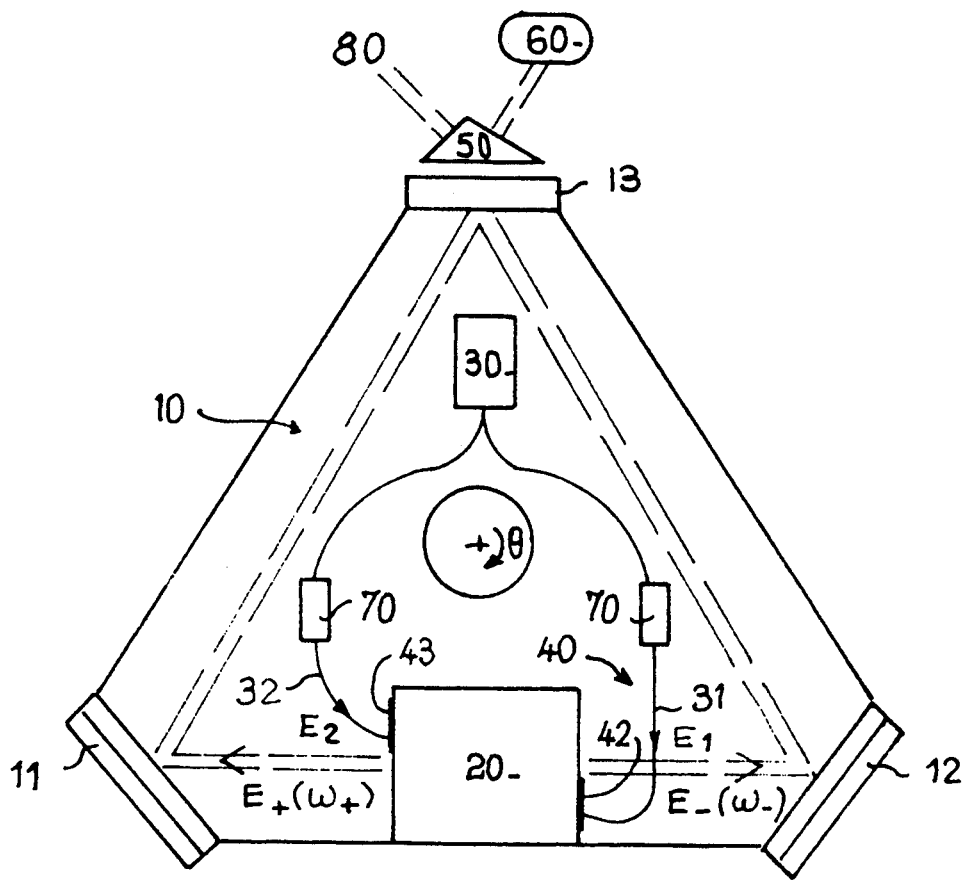
FIG. 3 is a detailed view of another configuration of a gyrometer according to the invention.

This is illustrated in FIG. 3 in which the components equivalent to those of FIG. 2 carry the same reference numerals. The optical device 40 for irradiating the optically non-linear medium with the aid of a laser diode is formed by optical fibers (not numbered) and intensity modulators 70 which may be, for example, acousto-optical modulators.

As concerns the rest of the active resonant ring gyrometer according to the invention, it is conventional and therefore employs current solutions known to those skilled in the considered art field. For example, and solely by way of illustration, the gyrometer is mounted on a stand (not numbered) formed of a highly dimensionally stable material such as "Zerodur", and the mirrors 11 and 12 of the ring are mirrors associated with piezo-electric ceramics. Likewise, the optical system 50 for causing the counter-rotative waves to interfere delivers "an output" signal 80 for controlling the length of the geometrical path of the ring. The optical system 50 shown in FIG. 3 is formed of a prism.

Figure 4A:
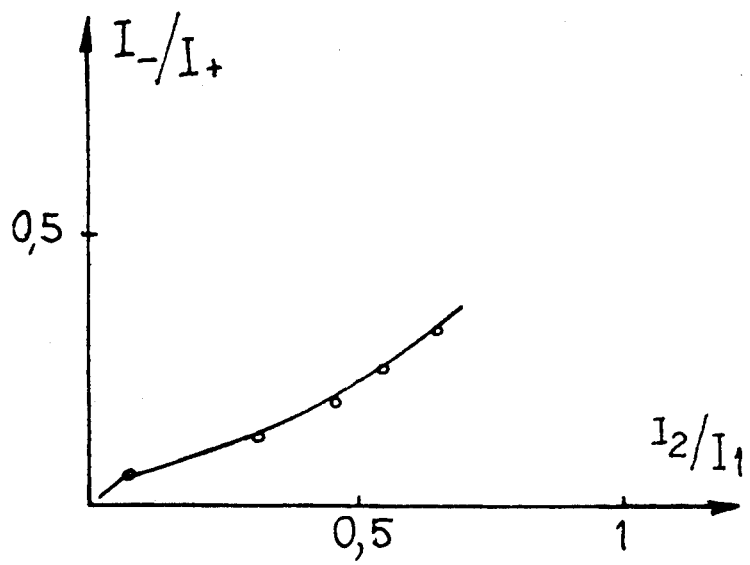
FIGS. 4A and 4B are curves illustrating the effect of the relative intensities of the pumping beams $I_1$ and $I_2$ on the intensities and the frequences of the counter-rotative waves respectively.

FIG. 4A illustrates the relative modulation of the intensities $I_1$ and $I_2$ of the waves $E_1$ and $E_2$ of the colinear pumping beams 31, 32 as a function of the intensities $I_+$ and $I_-$ of the counter-rotative waves $E_+$ and $E_-$.

Figure 4B:
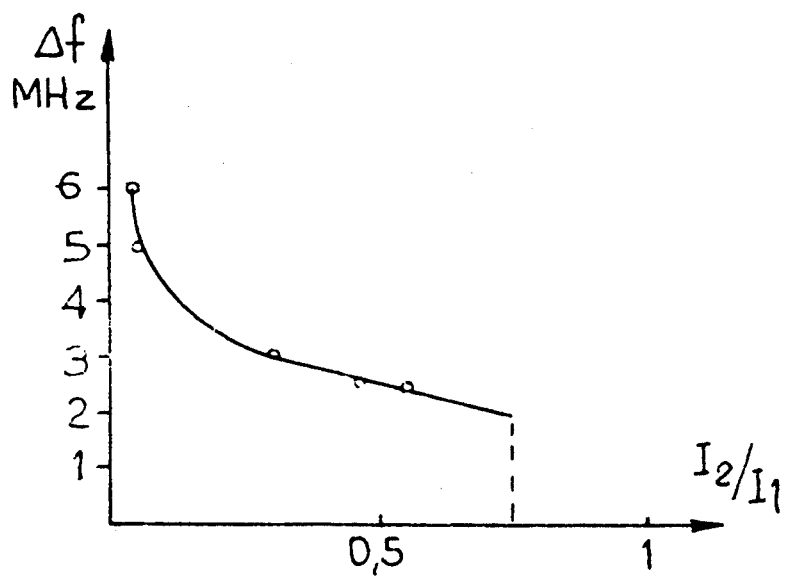

FIG. 4B illustrates the frequency slip $\Delta f$ between the frequencies $\omega_+$ and $\omega_-$ of the counter-rotative waves $E_+$ and $E_-$ obtained by means of the active resonant ring gyrometer according to the invention.

The advantages afforded by the active phase conjugation resonant ring gyrometer according to the invention are clear from the foregoing description.

The difficulties created by the existence of an electrical discharge have been eliminated. This eliminates the instabilities resulting from the gaseous flow, whether it is of thermal or electrical origin, ensures an increased mirror life and avoids having to employ the complex "vacuum" technology which, in particular, presents problems in connection with sealing and optical adherence.

The periodical "bias" or mechanical oscillatory swing has been eliminated. This avoids problems of machining, assembly, adjustment and maintenance.

The active phase conjugation resonant ring gyrometer according to the invention has only solid elements and is started up almost instaneously with no transitional operation; it provides an improved stability of the "false zero" by eliminating phenomena relating to the gaseous flow; and it operates with a very low coupling and a very low noise level during "random operation" which is associated with the periodic passage through the "blind" zone.

Moreover, the active phase conjugation resonant ring gyrometer according to the invention is insensitive to accelerations. This permits obtaining a periodical "bias" which, rather than a "sinusoidal" shape, has a "pulse" shape with a steep leading edge. This further reduces, and even eliminates, errors formerly present upon reversal of the direction of the oscillatory swing due to the relatively sudden change in the direction. Such reduction/elimination of error is possible because the periodical "bias" obtained optically is not subject to problems of inertia as was that obtained mechanically. This can be achieved by the acousto-optical or electro-optical modulation of the differences in the intensities of the colinear pumping beams.

The active phase conjugation resonant ring gyrometer according to the invention is cheaper in regard to construction and maintenance than conventional gyrometers and has a much higher reliability, the breakdown rate being extremely low.

We claim:

1. An active conjugation ring gyrometer with an optical bias, comprising:
    three main mirrors arranged so as to form a closed geometrical path therebetween, a resonant cavity being defined within said closed geometrical path;
    a cell mounted in said cavity and containing a non-photorefractive type optically non-linear medium;
    laser means for producing two pumping laser beams and for directing said two pumping laser beams in a colinear, oppositely directed manner to irradiate said medium;
    means for modulating the intensity of at least one of said two pumping laser beams to produce an optical bias;
    said medium defining a means for producing, from said two pumping laser beams, a coherent auto-oscillation of two conjugated counter-rotative waves by way of a four wave mixture without electrical excitation of said medium;
    interference means for causing interference of said two counter-rotative waves; and
    means for detecting a beat produced by said interference of said two counter-rotative waves.

2. An active phase conjugation ring gyrometer as recited in claim 1, wherein said two pumping laser beams have a frequency which is very close to the resonant frequency of said medium.

3. An active phase conjugation ring gyrometer as recited in claim 1, wherein said medium comprises an atomic vapor and a rare gas.

4. An active phase conjugation ring gyrometer as recited in claim 3, wherein said atomic vapor comprises sodium.

5. An active phase conjugation ring gyrometer as recited in claim 3, wherein said rare gas comprises helium.

6. An active conjugation ring gyrometer as recited in claim 1, wherein said medium comprises a semiconductor material.

7. An active phase conjugation ring gyrometer as recited in claim 1, wherein said intensity modulating means comprises an electro-optical component.

8. An active phase conjugation ring gyrometer as recited in claim 1, wherein said laser means comprises:
    means for producing a pumping laser beam;
    means for splitting said laser beam into two beams; and
    means for redirecting each of said two beams such that they are colinearly directed toward one another.

9. An active conjugation ring gyrometer as recited in claim 8, wherein said laser beam splitting means comprises a semi-transparent blade and said redirecting means comprises two additional mirrors.

10. An active phase conjugation ring gyrometer as recited in claim 1, wherein said laser means comprises:
    means for producing a pumping laser beam; and
    a pair of optical fibers, connected between said laser beam producing means and said cell.

11. An active phase conjugation ring gyrometer as recited in claim 1, wherein said interference means comprises a prism.

12. An active phase conjugation ring gyrometer as recited in claim 1, wherein one of said three main mirrors is partially transparent.

13. An active phase conjugation ring gyrometer as recited in claim 1, wherein said laser means comprises a laser which employs an agent selected from the group consisting of a coloring agent, a solid, a gas, a semiconductor and a diode.

14. An active phase conjugation ring gyrometer as recited in claim 1, wherein said interference means produces an output signal used for controlling the length of said closed geometrical path.

15. An active phase conjugation ring gyrometer as recited in claim 1, wherein said medium has a gain width which is much greater than the width of a resonance peak of said resonant cavity.

* * * * *